United States Patent
Dial et al.

(10) Patent No.: US 10,801,088 B2
(45) Date of Patent: Oct. 13, 2020

(54) NICKEL BASE SUPER ALLOYS AND METHODS OF MAKING THE SAME

(71) Applicant: GENERAL ELECTRIC COMPANY, Schenectady, NY (US)

(72) Inventors: Laura Cerully Dial, Clifton Park, NY (US); Michael Francis Xavier Gigliotti, Jr., Glenville, NY (US)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 16/221,452

(22) Filed: Dec. 15, 2018

(65) Prior Publication Data

US 2020/0024699 A1    Jan. 23, 2020

Related U.S. Application Data

(62) Division of application No. 14/963,366, filed on Dec. 9, 2015, now Pat. No. 10,378,087.

(51) Int. Cl.
| | | |
|---|---|---|
| *C22C 19/05* | (2006.01) | |
| *C22F 1/10* | (2006.01) | |
| *B23K 26/342* | (2014.01) | |
| *B23K 26/00* | (2014.01) | |
| *C22C 1/04* | (2006.01) | |
| *B33Y 80/00* | (2015.01) | |
| *B22F 3/105* | (2006.01) | |
| *H01F 1/147* | (2006.01) | |
| *B33Y 10/00* | (2015.01) | |
| *B23K 103/08* | (2006.01) | |

(52) U.S. Cl.
CPC .......... *C22C 19/056* (2013.01); *B22F 3/1055* (2013.01); *B23K 26/0006* (2013.01); *B23K 26/342* (2015.10); *B33Y 80/00* (2014.12); *C22C 1/0433* (2013.01); *C22F 1/10* (2013.01); *H01F 1/147* (2013.01); *B23K 2103/08* (2018.08); *B33Y 10/00* (2014.12); *Y02P 10/295* (2015.11)

(58) Field of Classification Search
CPC .................................. C22C 19/056; C22F 1/10
See application file for complete search history.

(56) References Cited

U.S. PATENT DOCUMENTS

| | | | |
|---|---|---|---|
| 3,524,744 A | 8/1970 | Parikh | |
| 4,169,742 A | 10/1979 | Wukusick et al. | |
| 4,359,352 A | 11/1982 | Ray et al. | |
| 4,624,716 A | 11/1986 | Noel et al. | |
| 4,708,750 A | 11/1987 | Field et al. | |
| 5,131,961 A | 7/1992 | Sato et al. | |
| 5,725,692 A * | 3/1998 | DeLuca | C22C 19/055 148/410 |
| 5,891,272 A | 4/1999 | Raymond et al. | |
| 6,495,793 B2 | 12/2002 | Tewari | |
| 7,208,116 B2 | 4/2007 | Manning et al. | |
| 7,708,846 B2 | 5/2010 | Malley | |
| 7,780,059 B2 | 8/2010 | Clark | |
| 8,231,730 B2 | 7/2012 | McLean | |
| 8,420,041 B2 | 4/2013 | Hashimoto et al. | |
| 8,506,836 B2 | 8/2013 | Szuromi et al. | |
| 8,640,942 B1 | 2/2014 | Ozbaysal et al. | |
| 8,793,871 B2 | 8/2014 | Morrison et al. | |
| 2007/0227630 A1 | 10/2007 | Augustins Lecallier et al. | |
| 2010/0143601 A1 | 6/2010 | Hawtof et al. | |
| 2012/0201691 A1 | 8/2012 | Dault et al. | |
| 2013/0108460 A1 | 5/2013 | Szwedowicz et al. | |
| 2013/0195673 A1 | 8/2013 | Godfrey et al. | |
| 2013/0228302 A1 | 9/2013 | Rickenbacher et al. | |
| 2013/0263977 A1 | 10/2013 | Rickenbacher et al. | |
| 2013/0319580 A1 | 12/2013 | Ozbaysal | |
| 2013/0328975 A1 | 12/2013 | Redding et al. | |
| 2013/0341838 A1 | 12/2013 | Vilaro et al. | |
| 2014/0034626 A1 | 2/2014 | Illston | |
| 2014/0079540 A1 | 3/2014 | Morris et al. | |
| 2014/0163717 A1 | 6/2014 | Das et al. | |
| 2014/0169981 A1 | 6/2014 | Bales et al. | |

(Continued)

FOREIGN PATENT DOCUMENTS

| | | |
|---|---|---|
| CA | 2 707 780 A1 | 12/2010 |
| CA | 2804402 A1 | 4/2012 |

(Continued)

OTHER PUBLICATIONS

Safari et al.,"On the heat treatment of Rene-80 nickel-base superalloy", Materials Science and Engineering Department, Journal of Materials Processing Technology, 2006, 176, pp. 240-250.

Gu et al., Laser additive manufacturing of metallic components: materials, processes and mechanisms, International Materials Reviews, vol. 57, Issue : 3, May 2012, pp. 133-134.

Acharya, R., et al., "Additive Manufacturing and Characterization of Rene 80 Superalloy Processed Through Scanning Laser Epitaxy for Turbine Engine Hot-Section Component Repair," Advanced Engineering Materials, vol. 17, No. 7, pp. 942-950 (May 15, 2015).

Bi, G., et al., "Microstructure and tensile properties of superalloy IN100 fabricated by micro-laser aided additive manufacturing," Materials & Design, vol. 60, pp. 401-408 (2014).

Harrison, N.J., et al., "Reduction of micro-cracking in nickel superalloys processed by Selective Laser Melting: A fundamental alloy design approach," Acta Materialia, vol. 94, pp. 59-68 (2015).

(Continued)

*Primary Examiner* — Jessee R Roe
(74) *Attorney, Agent, or Firm* — Dority & Manning, P.A.

(57) ABSTRACT

Methods of forming an intermediate alloy and a Ni-base super alloy are disclosed along with the intermediate alloy and the Ni-base super alloy formed by the method. The method includes at least partially melting and solidifying a powder including about 5 to 15 wt. % of Co, 10 to 20 wt. % of Cr, 3 to 6 wt. % of Mo, 3 to 6 wt. % of W, 2 to 4 wt. % of Al, 4.2 to 4.7 wt. % of Ti, 0.01 to 0.05 wt. % of Zr, 0.015 to 0.060 wt. % of C, 0.001 to 0.030 wt. % of B and balance substantially Ni to form an intermediate alloy including a dendrite structure that includes columnar regions and intercolumnar regions and a primary dendrite arm spacing less than about 3 micrometers. The intermediate alloy is heat-treated to form the texture-free Ni-base super alloy.

10 Claims, 4 Drawing Sheets

(56) References Cited

U.S. PATENT DOCUMENTS

| | | |
|---|---|---|
| 2014/0170012 A1 | 6/2014 | Delisle et al. |
| 2014/0209576 A1 | 7/2014 | Ozbaysal et al. |
| 2014/0209577 A1 | 7/2014 | Bruck et al. |
| 2014/0216042 A1 | 8/2014 | Hanson |
| 2014/0248512 A1 | 9/2014 | Kamel et al. |
| 2014/0295087 A1 | 10/2014 | Rickenbacher et al. |
| 2014/0308539 A1 | 10/2014 | Witz et al. |
| 2014/0314581 A1 | 10/2014 | McBrien et al. |
| 2015/0322557 A1 | 11/2015 | Etter et al. |
| 2015/0344994 A1 | 12/2015 | Etter et al. |

FOREIGN PATENT DOCUMENTS

| | | |
|---|---|---|
| CA | 2 878 711 A1 | 4/2014 |
| CA | 2 898 313 A1 | 7/2015 |
| CN | 1871367 A | 11/2006 |
| CN | 1914339 A | 2/2007 |
| CN | 103668461 A | 3/2014 |
| CN | 104313397 A | 1/2015 |
| CN | 104911407 A | 9/2015 |
| EP | 2 781 691 A1 | 9/2014 |
| EP | 2 886 225 A1 | 6/2015 |
| JP | S56-020345 B1 | 5/1981 |
| JP | 2007-277721 A | 10/2007 |
| WO | 2012/047352 A2 | 4/2012 |
| WO | 2014/052323 A1 | 4/2014 |
| WO | 2015/047128 A1 | 4/2015 |

OTHER PUBLICATIONS

Kelbassa, I., et al., "Manufacture and Repair of Aero Engine Components Using Laser Technology (Invited Paper)," Proceedings of the 3rd Pacific International Conference on Application of Lasers and Optics, pp. 208-213 (2008).

Extended European Search Report and Opinion issued in connection with corresponding EP Application No. 16202589.4 dated May 26, 2017.

Office Action issued in connection with corresponding CA Application No. 2949270 dated Dec. 19, 2017.

Machine Translation and Notification of Reasons for Refusal issued in connection with corresponding JP Application No. 2016-234615 dated Feb. 27, 2018.

First Office Action and Search issued in connection with corresponding CN Application No. 201611128355.4 dated Mar. 6, 2018.

Office Action issued in connection with corresponding CA Application No. 2949270 dated Oct. 25, 2018.

Indian Office Action Corresponding to Application No. 201644041629 dated Dec. 27, 2019.

\* cited by examiner

NICKEL BASE SUPER ALLOYS AND METHODS OF MAKING THE SAME

CROSS REFERENCE TO RELATED APPLICATIONS

This patent application is a divisional of U.S. Non-Provisional patent application Ser. No. 14/963,366 filed on Dec. 09, 2015, now U.S. Pat. No. 10,378,087, which is incorporated by reference herein in its entirety.

BACKGROUND

The present invention relates to nickel base (Ni-base) super alloys and methods of making the same. More particularly, this invention relates to intermediate alloys and texture-free Ni-base super alloys having a particular composition, and methods of making the same.

Ni-base super alloys are very useful set of alloys that can be designed to be used with substantial creep and oxidation resistances at high temperatures, often in excess of 0.7 of their absolute melting temperatures. One form of high-temperature nickel base alloy of particular interest is a cast form, designed for desired creep and environmental properties, such as for example, oxidation resistance and hot corrosion resistance. One of the nickel base composition that is widely used, especially in hot gas path components, is the Rene 80™ material trademarked by General Electric Company.

Additive manufacturing is a suite of emerging technologies that fabricate three-dimensional objects directly from digital models through an additive process, typically by depositing layer upon layer and joining them in place. Unlike traditional manufacturing processes involving subtraction (e.g., cutting and shearing) and forming (e.g., stamping, bending, and molding), additive manufacturing joins materials together to build products.

Certain components, such as for example, turbine engine hot gas path components made by nickel base super alloys can benefit from the design flexibility of additive manufacturing techniques. However, additive manufacturing methods may create certain challenges in the manufacturability of the nickel base super alloys and further in forming the nickel base super alloys having properties similar to the nickel base super alloys that are manufactured by the traditional casting method. Therefore, it is desirable to design a nickel base super alloy that can be manufactured using the additive manufacturing methods and have properties that are similar to their cast counterparts.

BRIEF DESCRIPTION

Briefly, one embodiment is directed to a method. The method includes at least partially melting and solidifying a powder including about 5 to 15 wt. % of Co, 10 to 20 wt. % of Cr, 3 to 6 wt. % of Mo, 3 to 6 wt. % of W, 2 to 4 wt. % of Al, 4.2 to 4.7 wt. % of Ti, 0.01 to 0.05 wt. % of Zr, 0.015 to 0.060 wt. % of C, 0.001 to 0.030 wt. % of B and balance substantially Ni to form an intermediate alloy including a dendrite structure that includes columnar regions and intercolumnar regions. A primary dendrite arm spacing of the dendrite structure is less than about 3 micrometers. The method further includes heat-treating the intermediate alloy in a temperature range from about 1050° C. to about 1250° C. to form a texture-free super alloy.

Another embodiment is directed to an intermediate alloy. The intermediate alloy includes a dendrite structure that includes columnar regions and intercolumnar regions. A primary dendrite arm spacing of the dendrite structure is less than about 3 micrometers. The intermediate alloy has a composition that includes about 5 to 15 wt. % of Co, 10 to 20 wt. % of Cr, 3 to 6 wt. % of Mo, 3 to 6 wt. % of W, 2 to 4 wt. % of Al, 4.2 to 4.7 wt. % of Ti, 0.01 to 0.05 wt. % of Zr, 0.015 to 0.060 wt. % of C, 0.001 to 0.030 wt. % of B and balance substantially Ni.

Another embodiment is directed to a Ni-base super alloy. The Ni-base super alloy includes a composition that include about 5 to 15 wt. % of Co, 10 to 20 wt. % of Cr, 3 to 6 wt. % of Mo, 3 to 6 wt. % of W, 2 to 4 wt. % of Al, 4.2 to 4.7 wt. % of Ti, 0.01 to 0.05 wt. % of Zr, 0.015 to 0.060 wt. % of C, 0.001 to 0.030 wt. % of B and balance substantially Ni. The Ni-base super alloy includes a gamma phase matrix, precipitates of a gamma-prime phase, and metal carbides precipitated from the gamma phase matrix. The metal carbides that are in the Ni-base super alloy is less than about 0.3 mole % of the composition, and an average size of the metal carbides is less than about 1 micrometer.

DRAWING

These and other features, aspects, and advantages of the present invention will become better understood when the following detailed description is read with reference to the accompanying drawing, wherein.

DETAILED DESCRIPTION

Figure 1:
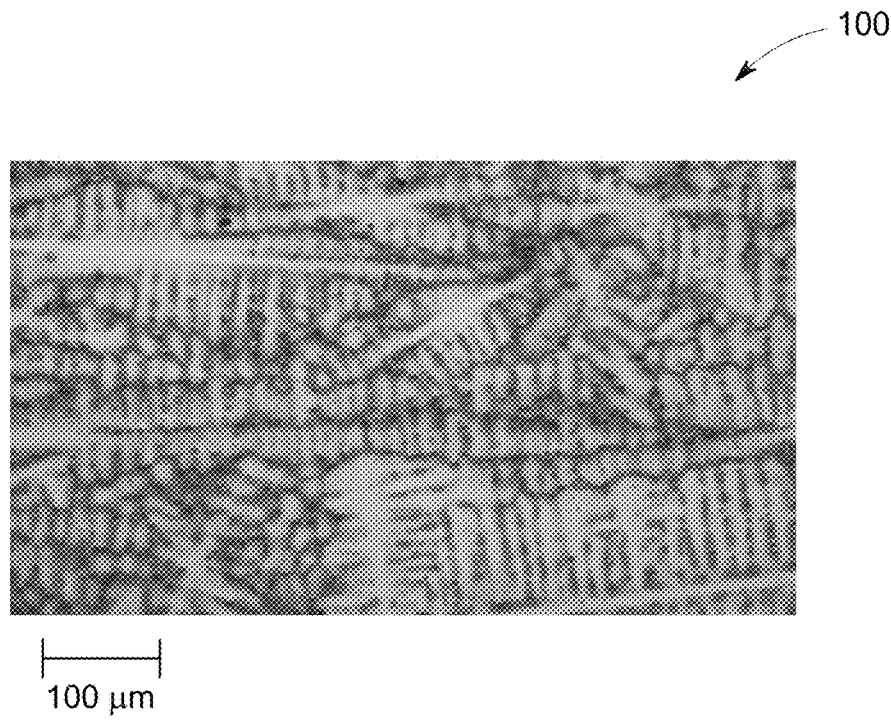
FIG. 1 illustrates a low magnification prior art microstructure image of an as-cast alloy formed by using a baseline Rene 80 composition.

The present invention is generally applicable to systems that include nickel base (Ni-base) super alloys and methods of forming Ni-base super alloys that operate within environments characterized by relatively high temperatures, and are therefore subjected to a hostile oxidizing environment and severe mechanical stresses. Notable examples of such components include turbine nozzles and blades, shrouds and augmentor hardware of gas turbine engines. While the advantages of this invention will be described with reference to gas turbine engine hardware, the teachings of the invention are generally applicable to any component that can be used in high temperature and harsh environments.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Embodiments of the invention described herein address the noted shortcomings of the state of the art. Some embodiments present a method of making intermediate alloys and Ni-base super alloys using additive manufacturing techniques. Further, some other embodiments present a method of making texture-free Ni-base super alloys using the additive manufacturing techniques.

Additive manufacturing refers to a process by which digital three dimensional (3D) design data is used to build up a component by adding-in layers of material deposition. A material may be used in a powder form for building a component in a layer by layer manner. Additive manufacturing may include 3D printing, rapid prototyping (RP), direct digital manufacturing (DDM), layered manufacturing, and additive fabrication. Advantageously additive manufacturing is a design-driven manufacturing process that facilitates manufacturing of structures having complex design. Further, additive manufacturing provides a high degree of design freedom, optimization and integration of functional features, and a relatively high degree of product customization.

Additive manufacturing may include certain specific processes, such as for example, selective laser sintering, direct metal laser sintering, selective laser melting, and direct metal laser melting etc. While the embodiments disclosed herein are described with reference to direct metal laser melting (DMLM) process, other additive manufacturing techniques along with required design and process variations may be used for producing an intermediate alloy, a Ni-base super alloy, or both the intermediate alloy and the Ni-base super alloy disclosed herein.

In certain embodiments, the DMLM process starts by applying a thin layer of a powder material to a building platform. A laser beam is used to melt or fuse the powder at one or more defined portions. In one example, the portions may be defined by computer-generated component design data. Subsequently, a second layer of powder is applied on the previous layer of the powder. Optionally, the building platform may be adjusted (for example, lowered) before applying the second layer of powder. Further, material in the second layer of powder may be melted or fused so as to bond the material in the second layer of powder with the layer below at one or more predefined portions. Similarly, subsequent layers of powder may be deposited on the second layer and one or more portions in these subsequent layers may be melted and solidified to form bonds between adjacent layers. Further, the melted parts in intermediate steps or after laying out all the layers results may be solidified in a desired component of required size and shape. Moreover, in some embodiments, the resulting components may be subjected to further heat-treatment to impart desirable properties to the component, such as for example, required microstructure and high temperature stability.

A microstructure of a Ni-base super alloy may depend on the composition of the super alloy. Consequently, during service, properties exhibited by a component made from this Ni-base super alloy depend on the composition of the super alloy. Further, during service, properties exhibited by the component made from this Ni-base super alloy also depend on a method of making the super alloy during formation of the component. Particularly, in the Ni-base super alloys, the method of manufacture and the further heat-treatment given to the component may determine the strength and robustness of the component.

In some embodiments, the DMLM process is used to build a component from a Ni-base super alloy. The Ni-base super alloy has a composition that assists in achieving properties, such as, but not limited to, high temperature strength, oxidation resistance, and creep resistance that are desirable for high temperature and/or high pressure applications. One example of a Ni-base super alloy composition that may be used for a gas turbine component is a Rene 80™ composition. A standard Rene 80 composition may include cobalt (Co), chromium (Cr), molybdenum (Mo), tungsten (W), aluminum (Al), titanium (Ti), zirconium (Zr), carbon (C), and boron (B), along with nickel (Ni). Depending on required applications, amounts of each of these elements may vary to a desirable extent in a given standard Rene 80 alloy. In some embodiments, a standard Rene 80 composition including about 5 to 15 wt. % of Co, 10 to 20 wt. % of Cr, 3 to 6 wt. % of Mo, 3 to 6 wt. % of W, 2 to 4 wt. % of Al, 4.8 to 5.2 wt. % of Ti, 0.01 to 0.05 wt. % of Zr, 0.15 to 0.2 wt. % of C, 0.001 to 0.030 wt. % of B is used for a given application for use in a gas turbine component. This standard Rene 80 composition may be referred to as a "baseline Rene 80 composition" henceforth, in this application.

Generally a Ni-base super alloy formed by using the baseline Rene 80 composition includes a matrix comprising a gamma ($\gamma$) phase. The gamma-phase is a solid solution with a face-centered cubic (fcc) lattice and randomly distributed different species of atoms. In some embodiments, the Ni-base super alloy further includes precipitates of a gamma-prime ($\gamma'$) phase and/or gamma-double prime ($\gamma''$) phase.

In some embodiments, when a Ni-base super alloy having baseline Rene 80 composition is processed using the DMLM process and subjected to heat-treatment post processing, the super alloy is observed to have a different creep behavior as compared to a super alloy of the same composition formed by other processes, such as a casting process. Without being bound by any theory, the present inventors assign this difference in the creep behavior to a microstructural difference that occurs in the as-formed super alloy of the baseline Rene 80 composition as a result of the DMLM process. Possibly because of high cooling rates that are achieved in the DMLM process, a microstructure formed when the Ni-base super alloy is made via the DMLM process is distinctly different than a microstructure that is formed when the alloy is made using traditional casting or investment casting processes.

Figure 2:
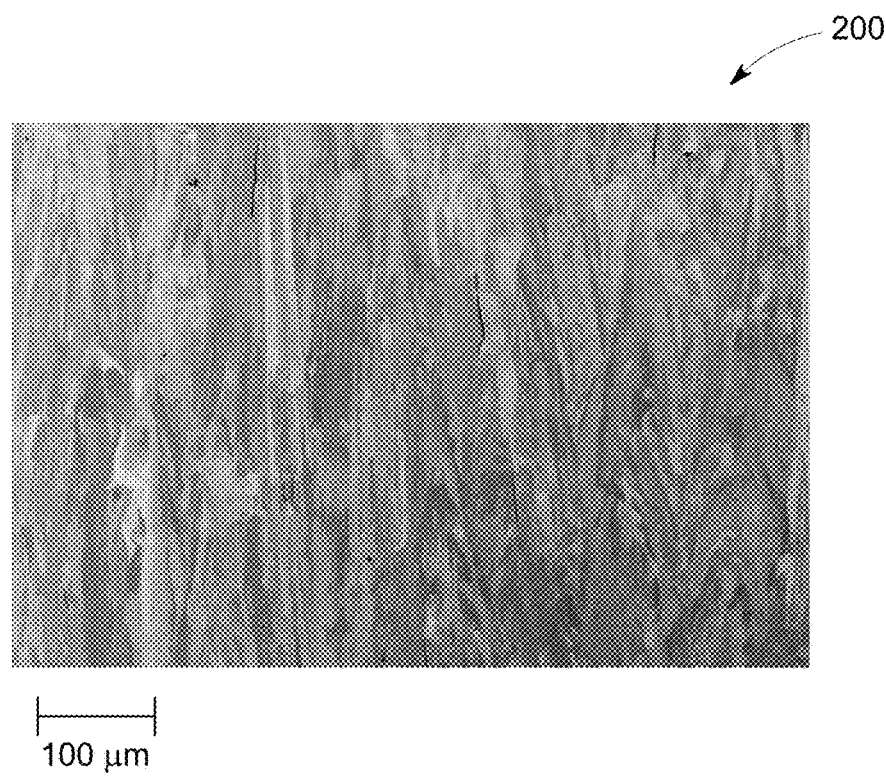
FIG. 2 illustrates a low magnification microstructure image of an as-built alloy formed by using the baseline Rene 80 composition and processed by direct metal laser melting (DMLM) process.
Figure 3:
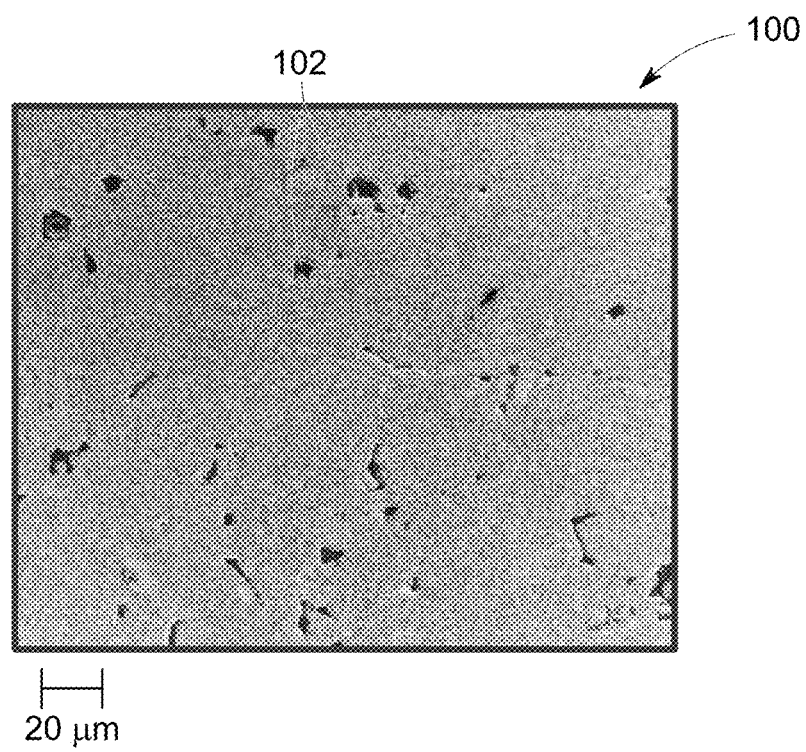
FIG. 3 illustrates a prior art microstructure image of an as-cast alloy formed by using the baseline Rene 80 composition.
Figure 4:
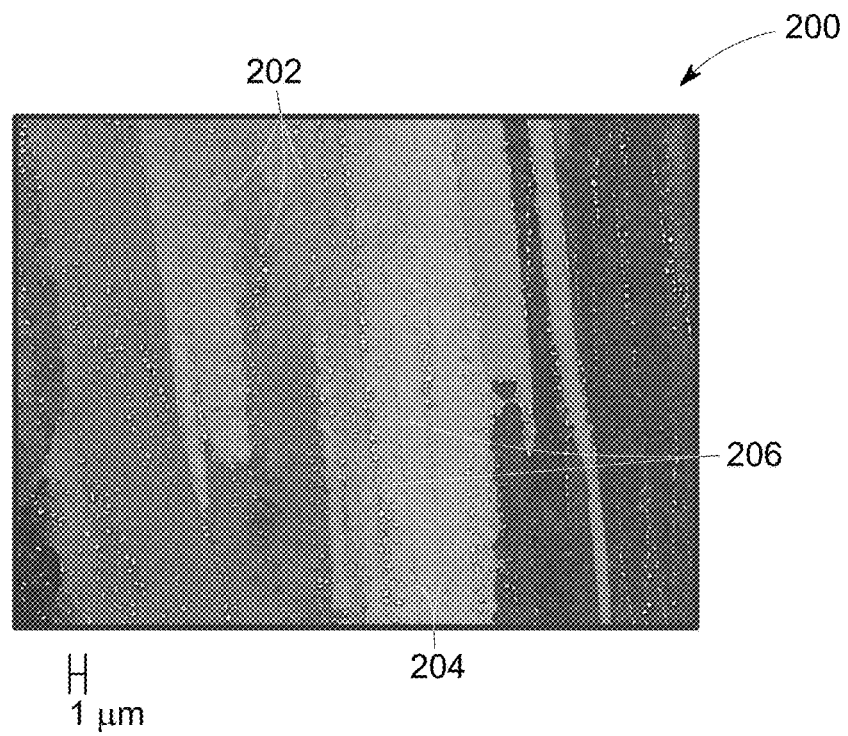
FIG. 4 illustrates a high magnification microstructure image of an as-built alloy formed by using the baseline Rene 80 composition and processed by the DMLM process.
Figure 5:
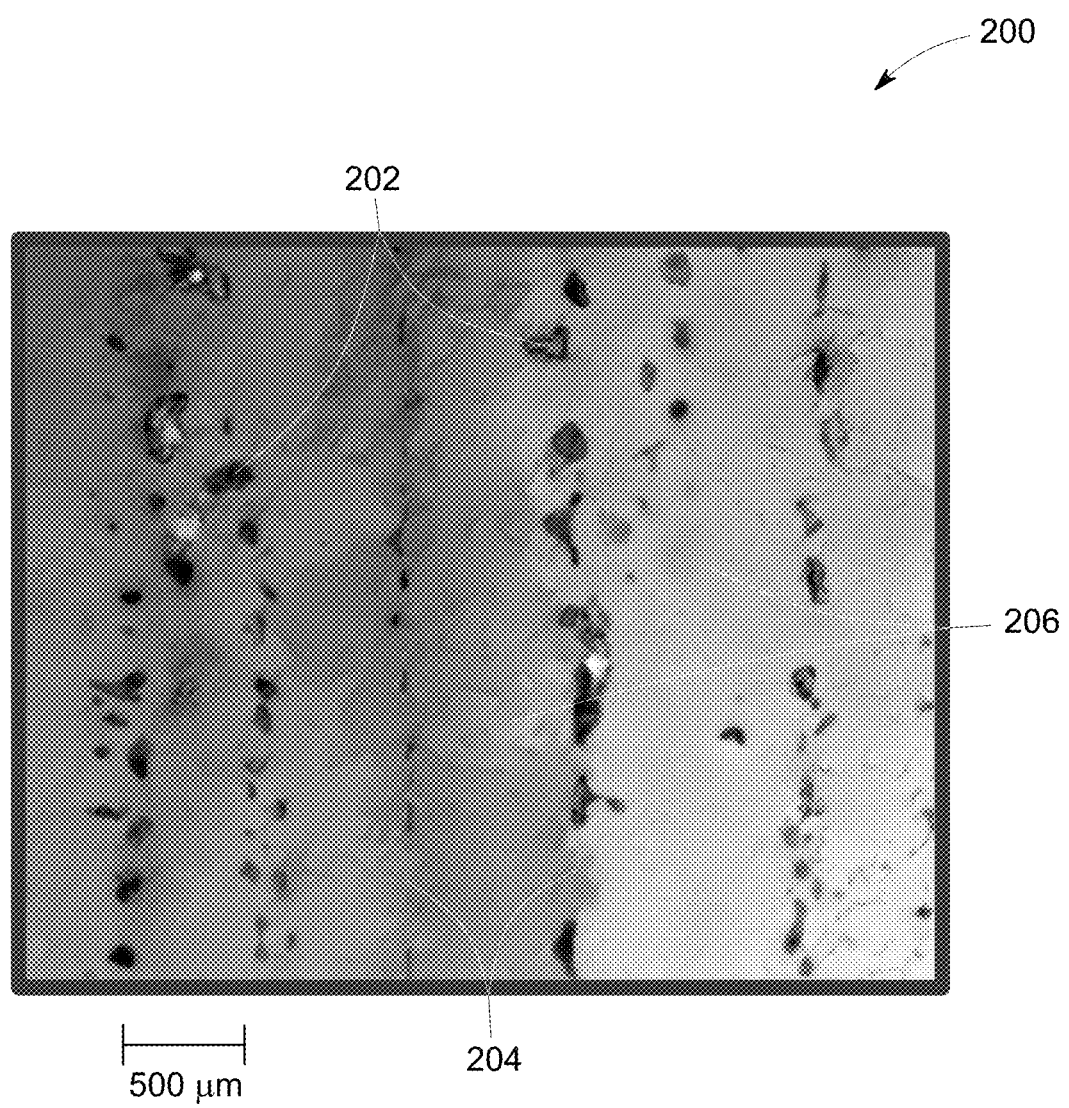
FIG. 5 illustrates a high magnification microstructure image of an as-built alloy formed by using the baseline Rene 80 composition and processed by the DMLM process.

FIG. 1 illustrates a low magnification prior art microstructure image of an as-cast alloy 100 of baseline Rene 80 composition and FIG. 2 illustrates a low magnification microstructure of an as-built alloy 200 of baseline Rene 80 composition processed by DMLM method. As used herein, the term "as-cast alloy" refers to an alloy made using conventional methods of casting, and the term "as-built alloy" refers to an alloy made using the DMLM process. The microstructure of the as-built alloy 200 of baseline Rene 80 composition includes a columnar structure. However, in the illustrated embodiment of FIG. 2, the columnar structure is too small to resolve into any finer details at the same magnification as that illustrated in the as-cast alloy 100 of FIG. 1. FIG. 3 shows another image of the prior art as-cast alloy 100 of baseline Rene 80 composition with a magnification scale of 20 micrometers. FIGS. 4 and 5 show comparatively high magnification images (than FIG. 2) of the as-built alloy 200 of the baseline Rene 80 composition. Specifically, FIGS. 4 and 5 illustrate the as-built alloy 200 of baseline Rene 80 composition with magnification scales of 1 micrometer (µm) and 500 nanometers (nms), respectively.

Comparing the as-cast alloy 100 of FIG. 3 with the as-built alloy 200 of FIGS. 4 and 5, it can be seen that carbides 102 that are present in the as-cast alloy 100 of FIG. 3 are observed to be randomly scattered in the alloy 100, while the carbides 202 that are seen in the as-built alloy 200 of FIGS. 4 and 5 are observed to be preferentially located in the intercolumnar regions 204. The intercolumnar regions 204 are defined by the columnar regions 206 of the as-built alloy 200 that are present as a signature of the DMLM process.

Further, it can be noted that the carbides 102 that are present in the microstructure of the as-cast alloy 100 of baseline Rene 80 composition as seen in FIG. 3 are distinctly different in their morphology and distribution than the carbides 202 that are present in the microstructure of the as-built alloy 200 of baseline Rene 80 composition as seen in FIGS. 4 and 5. For example, the carbides 102 of the as-cast alloy 100 are relatively large in size as compared to the carbides 202 that are present in the intercolumnar regions 204 of the as-built alloy 200. For example, while the carbides 102 that are present in the as-cast alloy 100 may have an average diameter of about 2-10 micrometers (µm), the average diameter of the carbides 202 that are observed in the as-built alloy 200 as seen in FIGS. 4 and 5 are less than about 300 nanometers (nm).

Furthermore, it is observed by the inventors that the carbides 202 that are present in the intercolumnar regions 204 of the as-built alloy of baseline Rene 80 composition are relatively more in number and form substantially closely spaced sections, such as films or arrays of carbides, in the intercolumnar regions 204. Formation of these films or arrays of smaller carbides in the intercolumnar regions 204 of the as-built alloy 200 was unexpected and were hitherto not noticed. By way of example, in as-cast alloy 100, such substantially closely spaced sections are generally not found.

Generally, strengthening mechanisms of Ni-base super alloys are known to be complex and mainly involve precipitation of intermetallic phases and carbides in the grains as well as at the grain boundaries. There may be three types of carbides which are found in Ni-base super alloys, namely MC type, $M_{23}C_6$ type, and $M_6C$ type carbides. MC type carbides are carbides with MC composition, where M is a metal and C is carbon. MC type carbides are known as primary carbides or solidification-type carbides, and act as a source of carbon for secondary carbides (e.g. carbides of $M_{23}C_6$ and $M_6C$ type). The primary and secondary carbides that are present at the grain boundaries may hinder any movement of dislocations and grain boundaries during formation or service of a component made by the Ni-base super alloys.

The high number density and close packing of the carbides 202 observed in intercolumnar regions 204 of the as-built alloy 200 may hinder any grain growth during further heat-treatment of the as-built alloy 200. Moreover, the closely spaced carbides 202 may effectively limit stress relaxation of grains through heat-treatment during formation or service of a component made by the as-built alloy 200. Additionally, failure to accommodate stress build-up may result in crack formation in the alloy, thereby compromising mechanical integrity and high temperature properties of the component made by these alloys.

Figure 6:
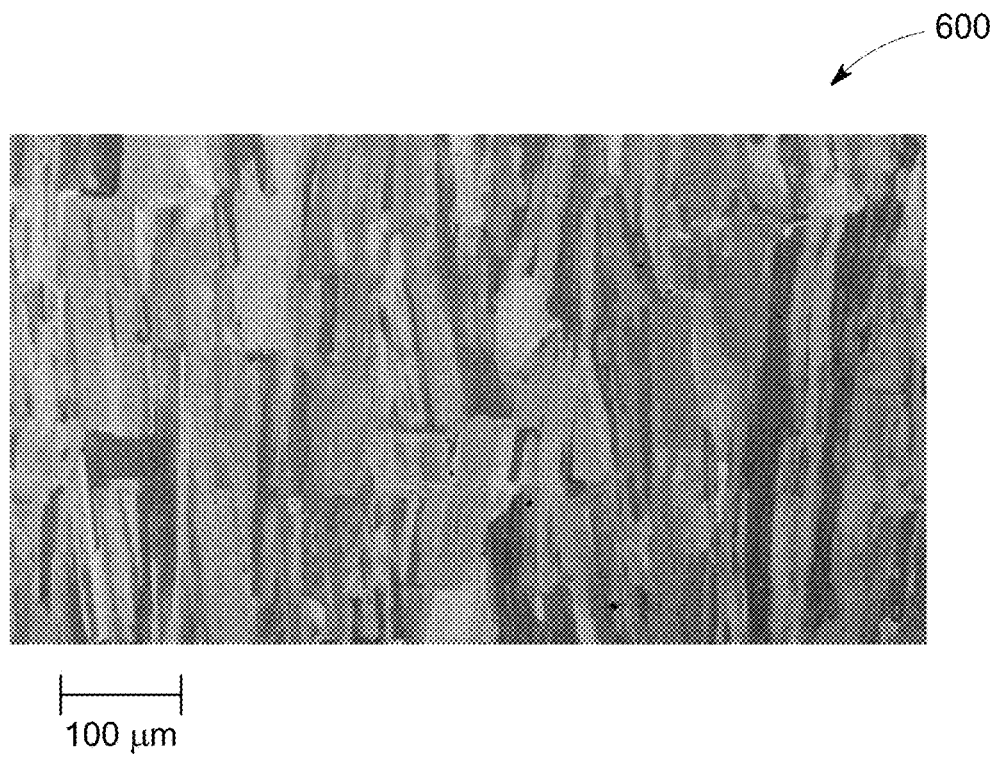
FIG. 6 illustrates a low magnification microstructure image of a nickel base super alloy formed by using the baseline Rene 80 composition and processed by the DMLM process.

FIG. 6 illustrates a low magnification microstructure of a Ni-base super alloy 600 that is obtained after heat-treating the as-built alloy 200 of the baseline Rene 80 composition. The heat-treatment is carried out at about 1200° C. using hot isostatic pressing (HIP) process. Comparing the microstructure of the as-built alloy 200 of FIG. 2 with the microstructure of the Ni-base super alloy 600 of FIG. 6, it is observed that increase in grain sizes of the Ni-base super alloy 600 is not significant from the grain sizes of the as-built alloy 200. This lack of grain growth may be attributed to the well-pinned microstructure of the as-built alloy 200. In addition, the columnar nature of the grains, and subsequent texture of the as-built alloy 200 is well-maintained in the Ni-base super alloy 600 formed by this method. Accordingly, in certain embodiments, a Ni-base super alloy 600 of the baseline Rene 80 composition, formed after heat-treatment of the as-built alloy 200 obtained by DMLM process, may have substantially anisotropic mechanical properties, such as, for example, anisotropic creep behavior. In some embodiments, reduction in creep properties and directional variations in creep capabilities of the Ni-base super alloy 600 may not be desirable. Without being bound by any particular theory, the inventors attribute this altered creep behavior to the reduced grain growth during heat-treatment of the as-built alloy 200.

For some applications, such as, for example, in hot gas path components, a Ni-base super alloy microstructure that includes substantially equi-axed grains, a matrix of gamma-nickel solid-solution with gamma-prime and a fine dispersion of carbides is desired with the grain-boundaries that are substantially free of embrittling carbide films or phases.

In some of these embodiments, the creep properties of the Ni-base super alloys 600 may be improved by enabling grain growth of the as-built alloy 200 during heat-treatment. Further, in some embodiments, a grain growth that yields a random orientation is desirable to more closely match the properties of the alloys built by the DMLM process with that of the heat-treated, as-cast alloy.

Without being bound by any particular theory, the inventors envisage that recrystallization and grain growth with substantially equi-axial orientation of the grains of the as-built alloy 200 may be formed by reducing the formation of the films or arrays of fine carbides in the intercolumnar regions of the alloys built by the DMLM process. Some embodiments described herein are directed towards reducing the carbide content in the intercolumnar regions of the as-built alloy.

In certain embodiments, carbide content in the grain boundaries may be reduced by using approaches, such as, but not limited to, reducing the carbon content in an initial reactive powder, reducing a metal content that participates in carbide formation, enabling more primary carbide formation using the available carbon and hindering the secondary carbide formation, directing the available carbon to be reacted with other elements than the material that are prone to form the secondary carbide formation, directing the carbon content to be in the grain regions, or combinations thereof, thereby hindering the grain boundary segregation of carbides.

Some embodiments described herein are directed at the method of reducing the carbide formation in the grain boundaries by reducing the carbon amount in the initial starting powder along with optional reduction in the percentages of metallic elements that are involved in secondary carbide formation. In certain embodiments, an amount of carbon present in the initial starting powder considered for processing by DMLM process is reduced compared to generally used carbon content in a powder used for forming the Ni-base super alloy. For example, in a Ni-base super alloy having the baseline Rene 80 composition, if the carbon content is in a range from about 0.15 wt. % to about 0.2 wt. %, an altered composition that is used in certain embodiments has a carbon content that is less than 0.15 wt. % of the overall powder composition.

In some embodiments, an amount of a primary carbide-forming element is also reduced, along with reducing the carbon content in the starting powder that is used for the formation of a Ni-base super alloy by the DMLM process. In some embodiments, an amount of titanium in the starting powder is restricted along with restricting carbon element, to limit the carbide formation in the alloy formed. For example, if the titanium is generally present in a range from about 4.8 wt. % to about 5.2 wt. % in a baseline Rene 80 powder composition used for casting, an altered Rene 80 powder composition that is used in certain embodiments of the present invention has a titanium content that is less than 4.7 wt. % of the overall powder composition.

Reducing an amount of a primary carbide-forming element, along with reducing carbon content, is particularly beneficial to retain a matrix alloy chemistry of the as-built alloy nominally similar to that of the as-cast alloy of the baseline Rene 80 composition. As used herein, the "matrix alloy chemistry" represents the alloy composition of the matrix phase. Retaining the matrix alloy chemistry is particularly advantageous to substantially avoid changes in some of the alloy chemistry-related properties, such as, for example, phase instabilities, decrease of strength of the formed alloy, and lattice misfit between various phases.

In addition to or in place of reducing the carbon content in the starting powder, in some embodiments, an amount of two or more primary carbide-forming metallic elements are also reduced. In certain embodiments, total amount of primary carbide-forming metallic elements is reduced to less than 5 wt. % of the overall composition of the starting powder. This reduction in the primary carbide-forming metallic elements may be carried out along with or in place of reducing the carbon content. As used herein, "primary carbide-forming metallic elements" include metallic elements that may form primary carbides in the normal processing conditions of forming an as-built alloy using the DMLM process, and where the carbides thus formed are likely to segregate to the intercolumnar regions of the as-built alloy. In some embodiments, the primary carbide-forming metallic elements may include transition metal elements of group 4A and group 5A of the periodic table. Non-limiting examples for the primary carbide-forming metallic elements may include one or more of titanium, zirconium, hafnium, vanadium, niobium, and tantalum. In some embodiments, reduction in an amount of the primary carbide-forming metallic elements is in addition to the reduction in the carbon level in the starting powder, and may be in proportion to the reduction in the carbon level. In one embodiment, the reduction in a total atomic percentage of the primary carbide-forming metallic elements is substantially equal to the atomic percentage reduction of carbon in the starting powder.

Further, without being bound by any theory, it is believed by the inventors that when a percentage of carbon and carbide-forming metallic elements are below a determined value in the initial powders that are used for forming the Rene 80 alloy with altered Rene 80 composition, the primary carbides (of MC type) that are formed in the alloy are primarily precipitated from the gamma phase matrix on cooling after solidification, rather than during solidification from the melt itself. This is in contrast to forming an alloy with the baseline Rene 80 composition, where the carbon and carbide-forming metals are present in a relatively high amount and induce the formation of solidification-type (i.e. solidifying from the melt) primary carbide precipitation. These solidification-type carbides formed in the baseline Rene 80 composition are observed to be located in and around the grain boundaries. However, the primary carbides that precipitate from the gamma phase matrix in the altered Rene 80 composition are not confined to grain boundaries. Advantageously, the primary carbides that precipitate from the gamma phase matrix are well-distributed throughout the microstructure of the as-built alloy, though preferentially distributed in the intercolumnar regions of dendrites. Consequently, when an as-built alloy formed from the DMLM process using altered Rene 80 composition (having lowered amounts of carbon and carbide-forming elements) is heat-treated, the primary carbides that are well-dispersed in the microstructure may re-precipitate into the secondary carbides ($M_{23}C_6$/$M_6C$) during subsequent heat treatment, and may be well-dispersed both in the grains and in the grain boundaries of the heat treated Ni-base super alloy thus formed.

In some embodiments, a method for making the as-built alloy using the DMLM process includes at least partially melting and solidifying a powder that includes about 5 to 15 wt. % of Co, 10 to 20 wt. % of Cr, 3 to 6 wt. % of Mo, 3 to 6 wt. % of W, 2 to 4 wt. % of Al, 4.2 to 4.7 wt. % of Ti, 0.01 to 0.05 wt. % of Zr, 0.015 to 0.060 wt. % of C, and 0.001 to 0.030 wt. % of B and balance substantially Ni. In certain embodiments, the titanium content may be in a range from about 4.2 wt. % to about 4.7 wt. % of the powder, and in some further embodiments, the titanium content may be in a range from about 4.4 wt. % to about 4.6 wt. % of the powder. Further, in certain embodiments, the carbon content may be in a range from about 0.01 wt. % to about 0.04 wt. % of the powder, and in some further embodiments, the titanium content may be in a range from about 0.01 wt. % to about 0.03 wt. % of the powder. The selected carbon ranges provided herein particularly aid in reducing dense distribution of carbides in the grain and intercellular boundaries.

In some embodiments, an as-built alloy is formed by using a powder with the altered Rene 80 composition having carbon in a range from about 0.015 wt. % to about 0.060 wt. % and titanium in an amount in a range from about 4.2 wt. % to about 4.7 wt. % of the powder. This as-built alloy, formed by using the powder having the above-mentioned altered Rene 80 composition may be referred to as an "intermediate alloy" henceforth, in this application.

In some embodiments, partial melting and solidification may be carried out as part of the DMLM process in building the intermediate alloy. As described hereinabove, the intermediate alloy formed by melting and solidifying the altered Rene 80 composition has columnar regions. A columnar region is a region of elongated dendrites having a preferred orientation. Columnar regions may be formed as a result of competitive growth at a particular direction during the solidification step. Intercolumnar regions are the regions between adjacent columnar regions. Dendritic growth is a general form of crystal growth encountered when metals, alloys and many other materials solidify under low thermal gradients. The dendritic growth includes columnar regions and intercolumnar regions.

A dendrite or dendrite structure is generally characterized by the microstructure parameters associated with the dendrites. The microstructure of the dendrite structure of the intermediate alloy is normally characterized by primary dendrite or cellular arm spacing. A primary dendrite arm spacing is a characteristic length scale that is used to determine segregation patter in in alloy solidification. Generally the primary dendrite arm spacing is obtained by measuring distances between cores (centers) of neighboring dendrites. In some embodiments, a primary dendrite arm spacing of the dendrite structure of the intermediate alloy is less than about 3 micrometers. In certain embodiments, the primary dendrite arm spacing of the dendrite structure of the intermediate alloy is less than about 2 micrometers. In certain embodiments, a primary dendrite arm spacing of the dendrite structure is less than about 3 micrometers. The intermediate alloy has a composition that includes about 5 to 15 wt. % of Co, 10 to 20 wt. % of Cr, 3 to 6 wt. % of Mo, 3 to 6 wt. % of W, 2 to 4 wt. % of Al, 4.2 to 4.7 wt. % of Ti, 0.01 to 0.05 wt. % of Zr, 0.015 to 0.060 wt. % of C, 0.001 to 0.030 wt. % of B and balance substantially Ni.

In some embodiments, the dendrite structure that is formed in the intermediate alloy has only primary arms and arm spacings and may not contain any substantial secondary arms and secondary arm spacings. These dendrite structures that only have the primary arms and arm spacings are referred to as cell structures.

During melting and solidification of the powder, multiple chemical reactions may occur between the elements present in the powder to form the intermediate alloy. Upon melting and solidification, the intermediate alloy, having relatively low levels of carbon and carbide-forming metallic elements, may have relatively low level of metal carbide formation as compared to an as-cast alloy using the baseline Rene 80 composition with regular levels of carbon and carbide-forming metallic elements. Accordingly, in some embodiments of the method, an amount of the metal carbides present in the intermediate alloy is less than about 0.5 mole % of the composition of the intermediate alloy. In particular, the initial powder composition that is used for the formation of the intermediate alloy includes carbide formers in an amount such that an equilibrium carbide content of the intermediate alloy is less than about 0.5 mole % at temperatures about the solidus temperature. In certain embodiments, the amount of metal carbides may be further limited to be less than about 0.3 mole % of the intermediate alloy composition.

In certain embodiments, the metal carbides that are precipitated in the intermediate alloy may be present both in the columnar and intercolumnar regions. In some embodiments, the metal carbides are disposed in the intercolumnar regions of the intermediate alloy. Metal carbides present in the intercolumnar regions may hinder the grain growth to a greater extent during a heat-treatment as compared to metal carbides that are present within the columnar regions. In some embodiments, an amount of the metal carbides present in the intercolumnar regions of the dendrite structure is less than about 0.3 mole % of the intermediate alloy composition. The amount of metal carbides in the intercolumnar regions may further be limited to be less than about 0.2 mole % of the intermediate alloy composition, in accordance to certain embodiments.

The method further includes heat-treating the intermediate alloy in a temperature range from about 1050° C. to about 1250° C. to form a texture-free Ni-base super alloy. This Ni-base super alloy, formed by heat-treating the intermediate alloy (of altered Rene 80 composition) may be referred to as a "modified Ni-base super alloy" henceforth, in this application.

It may be noted that composition of the modified Ni-base super alloy is considered to have substantially similar composition as that of the intermediate alloy. In particular, there is no substantial change that occurs in the matrix alloy chemistry of the intermediate alloy, when the intermediate alloy is subjected to the heat-treatment to form the modified Ni-base super alloy. The matrix alloy composition of the modified Ni-base super alloy is substantially formed in the intermediate alloy form itself. Specifically, the heat-treatment step used for converting the intermediate alloy to the modified Ni-base super alloy is a processing step that is used for altering the microstructure of the intermediate alloy to that of the modified Ni-base super alloy, than for forming the composition of the modified Ni-base super alloy. A slight variation in the composition of the intermediate alloy and the modified Ni-base super alloy, if present, may be due to an interaction between the already formed intermediate alloy with the environment. Any such variation in the composition during heat-treatment is limited to less than about 1 volume % of the modified Ni-base super alloy. In some embodiments, the method includes heat-treating the intermediate alloy in a temperature range from about 1150° C. to about 1250° C. to form the modified Ni-base super alloy.

The heat-treatment that is imparted to an intermediate alloy having a low carbide content in the intercolumnar regions as noted above allows for a substantial grain growth in the modified Ni-base super alloy thus formed. The modified Ni-base super alloy includes grains, grain boundaries, and metal carbides. The metal carbides may be disposed in the grains or the grain boundaries. In some embodiments, the modified Ni-base super alloy is substantially free of carbides that are precipitated from the melt or liquid state of the alloy. In some embodiments, the modified Ni-base super alloy includes metal carbides that are precipitated from the solid gamma phase matrix. Further, an equi-axial orientation is observed in the Ni-base super alloy obtained from the powder with modified (lowered) carbon content. Hence the lowered carbon content aids to achieve a substantially modified Ni-base super alloy.

Figure 7:
FIG. 7 illustrates a low magnification microstructure of a Ni-base super alloy, processed by the DMLM process, according to an embodiment of the present technique.

FIG. 7 illustrates a low magnification microstructure of a modified Ni-base super alloy 700 that is obtained after heat-treating an intermediate alloy. The heat-treatment is carried out at about 1200° C. In some embodiments, heat-treatment is carried out using hot isotactic pressing (HIP) process. While the heat-treatment disclosed above is particularly directed to form the desired microstructural change in the intermediate alloy to form the modified Ni-base super-alloy, there may be certain other involuntary changes that may occur in the alloy during heat-treatment, such as, for example, change in the gamma-prime phase distribution. In some embodiments, an additional heat-treatment may be imparted to the heat-treated intermediate alloy to form the modified Ni-base super alloy 700. By way of example, the intermediate alloy may be subjected to the additional treatment to obtain carbide re-precipitation and/or to achieve a preferred gamma-prime distribution.

An effect of the amount of carbon or carbide formers in the initial powder can be clearly observed by comparing the microstructure of the modified Ni-base super alloy 700 of FIG. 7 with that of a Ni-base super alloy 600 that is obtained after heat-treating an as-built alloy of the baseline Rene 80 composition, as depicted in FIG. 6. The microstructure of the modified Ni-base super alloy 700 depicts larger and equi-axial grains as compared to the columnar grains with lower grain sizes of the Ni-base super alloy 600. The size and orientation of individual grains in the modified Ni-base super alloy 700 were further measured through the use of electron backscatter detection (EBSD) techniques (not shown). EBSD showed that the modified Ni-base super alloy 700 resulted in randomly oriented grains after heat treatment as well as substantial grain growth over the Ni-base super alloy 600 obtained by the baseline Rene 80 composition.

Thus in some embodiments, the modified Ni-base super alloy 700 formed by the above-described method is texture-free. As used herein the "texture-free alloy" is defined as "the alloy, wherein a preferred crystallographic orientation in any direction is less than 20% by volume of any representative region of the alloy considered". In some embodiments, the crystallographic orientation in the modified Ni-base super alloy 700 is less than 10 volume %, and in certain embodiments, the modified Ni-base super alloy 700 is substantially free of a preferred crystallographic orientation in any particular direction.

Considering that the composition of the modified Ni-base super alloy is substantially the same as the composition of the intermediate alloy, in some embodiments, an amount of the metal carbides present in the composition of the modified Ni-base super alloy is less than about 0.5 mole % of the composition. The amount of metal carbides may further be limited to be less than about 0.3 mole % of the modified Ni-base super alloy composition, in accordance to certain embodiments. The amount of metal carbides in the modified Ni-base super alloy may further be limited to be less than about 0.2 mole % of the modified Ni-base super alloy composition, in accordance to certain embodiments. Furthermore, an average size of the metal carbides in the modified Ni-base super alloy may be less than about 1 micrometer.

In some embodiments, the modified Ni-base super alloy formed herein includes a composition that includes about 5 to 15 wt. % of Co, 10 to 20 wt. % of Cr, 3 to 6 wt. % of Mo, 3 to 6 wt. % of W, 2 to 4 wt. % of Al, 4.2 to 4.7 wt. % of Ti, 0.01 to 0.05 wt. % of Zr, 0.015 to 0.060 wt. % of C, 0.001 to 0.030 wt. % of B and balance substantially Ni. The modified Ni-base super alloy may be formed by the method described hereinabove and has a texture-free form that includes a gamma phase matrix, a precipitated gamma-prime phase, and metal carbides precipitated from gamma phase matrix. The metal carbides that are disposed in the modified Ni-base super alloy is less than about 0.3 mole % of the composition and an average size of the metal carbides that are present in the modified Ni-base super alloy is less than about 1 micrometer.

Advantageously, the modified Ni-base super alloy has a reduced carbide content in its composition, than just a reduced carbon amount. The reduced carbide content aids to maintain a local chemistry of the different phases of (other than carbides) present in the alloy, such as, for example, gamma and gamma-prime phases. Maintaining the local chemistry is particularly advantageous in that the alloy is not susceptible to size alterations and changes in lattice misfit between the matrix and precipitating phases.

Further, reduction of carbide content (rather than carbon content) in the modified Ni-base super alloy and maintaining the local phase chemistry similar to a standard parent alloy prepared using traditional routes, enhances long term microstructure stability of the modified Ni-base super alloy and further supports joining the modified Ni-base super alloy formed to an existing standard alloy.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An alloy, comprising:
a dendrite structure comprising columnar regions and intercolumnar regions, wherein a primary dendrite arm spacing of the dendrite structure is less than about 3 micrometers; and
a composition comprising about 5 to 15 wt % of Co, 10 to 20 wt % of Cr, 3 to 6 wt % of Mo, 3 to 6 wt % of W, 2 to 4 wt % of Al, 4.2 to 4.7 wt % of Ti, 0.01 to 0.05 wt % of Zr, 0.015 to 0.060 wt % of C, 0.001 to 0.030 wt % of B and balance substantially Ni.

2. The alloy of claim 1, wherein an amount of metal carbides present in the alloy is less than about 0.5 mole % of the composition.

3. The alloy of claim 2, wherein an amount of the metal carbides present in the alloy is less than about 0.3 mole % of the composition.

4. The alloy of claim 2, wherein the metal carbides are primarily disposed in the intercolumnar regions of the dendrite structure.

5. The alloy of claim 2, wherein an average diameter of the metal carbides is less than 300 nanometers.

6. The alloy of claim 1 formed by a direct metal laser melting (DMLM) method.

7. A texture-free Ni-base super alloy, comprising:
a composition comprising 5 to 15 wt % of Co, 10 to 20 wt % of Cr, 3 to 6 wt % of Mo, 3 to 6 wt % of W, 2 to 4 wt % of Al, 4.2 to 4.7 wt % of Ti, 0.01 to 0.05 wt % of Zr, 0.015 to 0.060 wt % of C, 0.001 to 0.030 wt % of B and balance substantially Ni;
a gamma phase matrix;
precipitates of gamma-prime phase; and
metal carbides precipitated from the gamma phase matrix, wherein
an amount of the metal carbides present in the Ni-base super alloy is less than about 0.3 mole % of the Ni-base super alloy; and
an average size of the metal carbides is less than about 1 micrometer.

8. The texture-free Ni-base super alloy of claim 7, wherein an amount of the gamma-prime phase in the Ni-base super alloy is greater than 40 volume percent.

9. The texture-free Ni-base super alloy of claim 7 formed by a direct metal laser melting (DMLM) method and heat-treating at a temperature range from about 1050° C. to about 1250° C.

10. The texture-free Ni-base super alloy of claim 9, wherein the Ni-base super alloy is substantially free of metal carbides precipitated from melt during solidification step of the DMLM method.

* * * * *